Fig. 3.

Patented Oct. 19, 1954

2,691,994

UNITED STATES PATENT OFFICE 2,691,994

HYDRAULICALLY ACTUATED PLANETARY GEARING FOR SAWMILL FEED WORKS

Glenn D. Ferguson, Onaga, Kans.

Application August 22, 1951, Serial No. 243,145

3 Claims. (Cl. 143—106)

(Granted under Title 35, U. S. Code (1952), sec. 266)

This invention relates to the control of mechanical movements and more particularly to the power train control for a reciprocating carriage of the type especially adapted for use with a sawmill.

In a sawmill it is customary to provide a carriage for supporting a log movable in one direction to feed the log to the saw and in the reverse direction to return to its starting place. It is preferable that the return motion be accomplished more quickly than the feed, the latter being restricted by the speed with which sawing may be accomplished, in order to reduce the time required for a sawing cycle.

Heretofore this has been accomplished by various systems, all rather complex or suffering from various deficiencies, by such means as employing a plurality of friction belt drives including shifting means therefor, or through intricate pulley systems and the like. Inherently accompanying these systems are substantially frictional losses, large numbers of parts such as ropes, belts and the like which involve substantial bulk and weight and require frequent replacement.

Accordingly, it is an object of the present invention to provide a power train and control means therefor particularly applicable but not restricted to a sawmill feed works in which the inherent friction accompanying the operation thereof, and the bulk and weight of the mechanism, are reduced to a minimum.

A further object is the provision of a sawmill feed works which is simple to construct from a minimum of parts and has a relatively small bulk and weight.

A still further object is the provision of a sawmill feed works which is so constructed as to reduce friction occasioned by its operation to a minimum and which is easy to operate and maintain.

A further object is the provision of a reversing and speed-changing mechanism particularly adapted for use with a sawmill feed works which is self-lubricating and sealed against the entry of foreign matter.

A still further object is the provision of a sawmill feed works which operates through an efficient planetary gear system and which is of a light weight and easy to operate.

These and other objects of the invention will become apparent from the following description taken in conjunction with the accompanying drawings in which.

Figure 1:
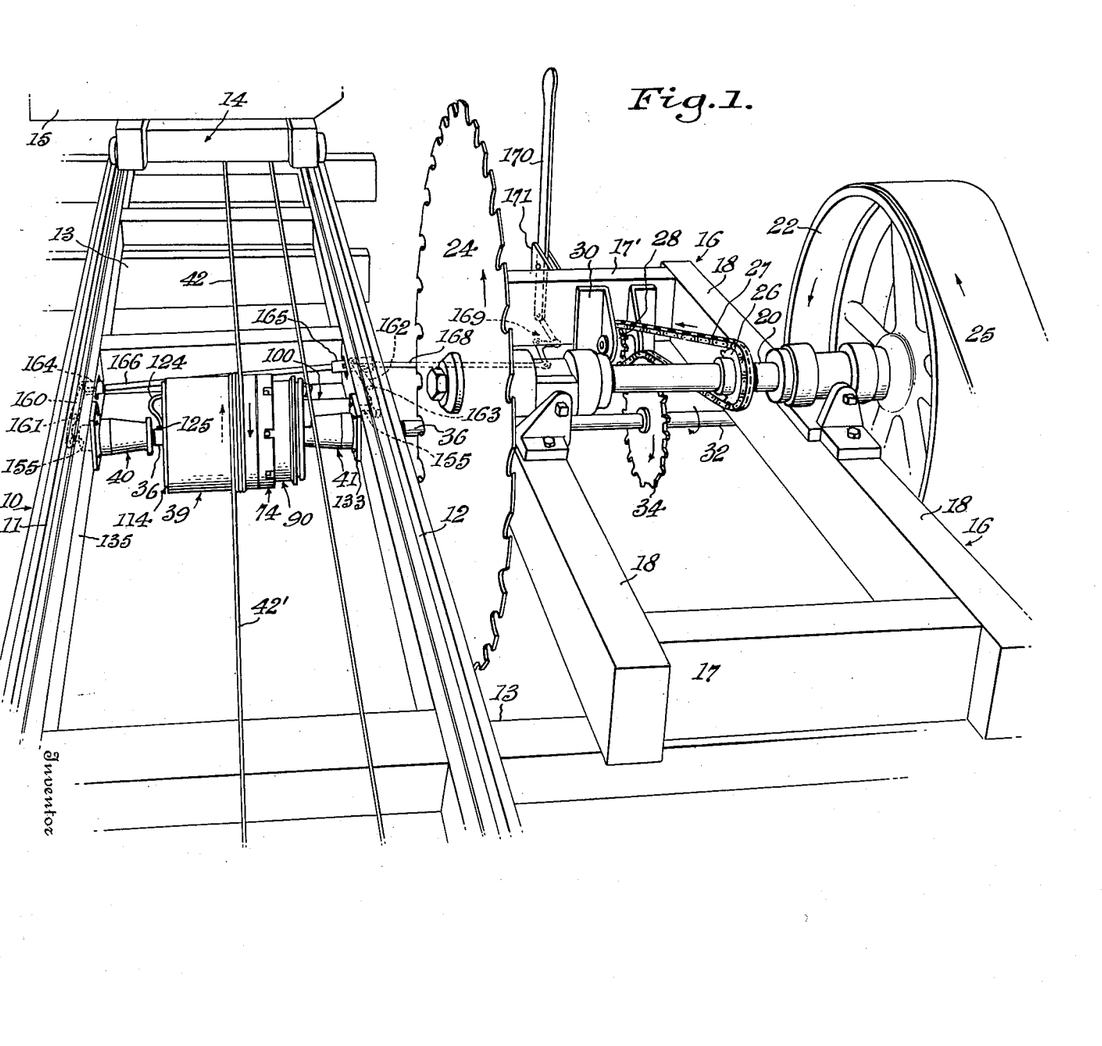
Fig. 1 is a perspective illustrating one embodiment of the invention.
Figure 11:
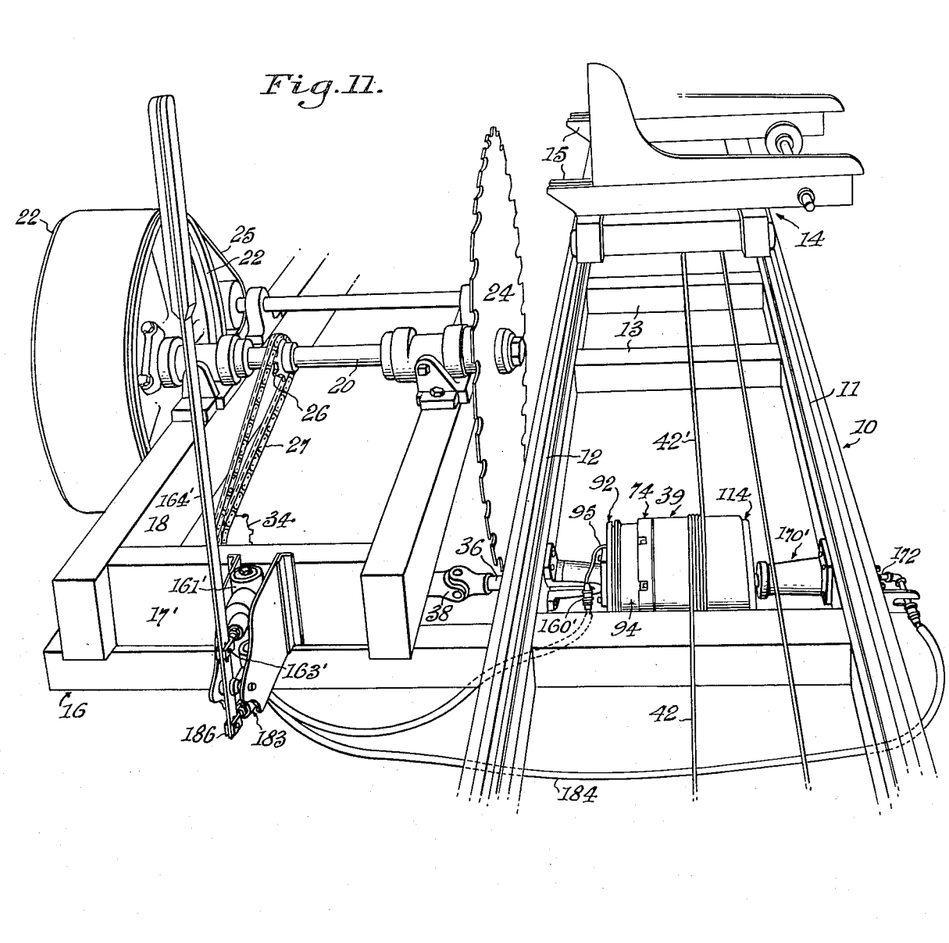
Fig. 11 is a perspective from the opposite side of the saw of Fig. 1 illustrating a modified form of the invention.

Referring to the drawings and particularly to Figs. 1 and 11, a sawmill is shown including a track 10 having left and right rails 11 and 12 (Fig. 1) spaced apart by and supported on a plurality of cross-members 13. Movably mounted on the track 10 is a carriage 14 having cross-members 15 for supporting a log to be sawed and means (not shown) for holding a log on the carriage.

Positioned adjacent the track is a supporting frame 16 having end members 17, 17' and side members 18. Rotatably supported across the side members 18 is a mandrel shaft 20 having a drive pulley 22 at one end and a circular saw 24 at the other. The pulley 22 is adapted to be driven by a belt 25 receiving its power from a conventional source (not shown), such as a smaller pulley driven by a gasoline or other type engine.

On the mandrel shaft 20 intermediate the pulley and saw is a sprocket 26 having engaged therewith a chain 27 which drives a smaller idler sprocket 28 mounted by a bracket 30 on the end frame member 17'.

Spaced from and substantially parallel with the mandrel shaft 20 is a main shaft 32 having a sprocket 34 disposed so as to be driven by chain 27 as it travels over sprockets 26 and 28. Shaft 32 is rotatably connected to a drive shaft 36 through a universal joint 38 (Fig. 11). Drive shaft 36 carries a substantially cylindrical housing 39 and is journalled in left and right bearing hangers 40 and 41 rigidly connected to the left and right rails 11 and 12.

Wound around the periphery of the housing 39 is a cable 42, 42' which extends through a sheave (not shown) mounted beyond carriage 14 and adjacent the track at one end and through a second sheave (not shown) mounted adjacent the track at the other end, the carriage being connected to the length 42' thereof. By rotating the housing or drum 39 in one direction the carriage 14 will be drawn toward the saw 24 to feed the log thereto and by reversing rotation of the housing 39 the carriage may be returned to its original position.

In order to rotate the housing 39 in the desired direction at will and to provide a more rapid return speed of the carriage than the feed speed, a planetary gear system and braking-clutching mechanism is mounted within the housing 39.

Referring particularly to Figs. 2 through 10, drive shaft 36 is provided with a sun gear 44, the latter being keyed to shaft 36 and located substantially centrally of housing 39. Rotatably mounted adjacent the sun gear 44 by left and right roller bearings 46 and 47 are left and right hangers 48 and 49, the hangers being connected by suitable fasteners extending through spaced apertures 50. Stub shafts 52 extend through spaced apertures 53 and have mounted thereon bearings 54. Each of the hangers has a plurality of spaced inclined oil holes 55 permitting circulation of oil from the bearings 46 and 47 into the space between the left and right hangers. Between hangers 48 and 49 and mounted on the bearings 54 are a plurality of planetary gears 56, three being shown spaced at equal intervals about the axis of the shaft 36. Planetary gears 56 are, therefore, rotatably mounted relative to the connected hangers 48 and 49, the hangers being rotatably mounted on the shaft 36.

An internal ring gear 60 surrounds and engages the planetary gears 56 and is rigidly secured to the right portion 61 of the interior wall of the housing 39. The housing 39, as previously stated, is substantially cylindrical, and has left and right open ends 62 and 63 and an internal flange 65 with a bearing receiving surface 66 disposed between its ends. The hangers 48 and 49 have circular wheel portions 68 to which the fasteners and planetary gears are connected, and hub portions 69, 69' extending outwardly from the connected portions of the hangers, the hub portions being carried on the shaft 36 by the bearings 46 and 47.

Encircling each of the hubs 69, 69' of the left and right hangers, respectively, is a ball-bearing assembly comprising an inner race 70, a plurality of balls 71, and an outer race 72. Mounted on the outer race 72 of the bearing 46 surrounding the hub of the left hanger 48 is the bearing receiving surface 66 of the flange 65 of the housing 39. See Fig. 3.

Mounted on the outer race 72 of the bearing 47 surrounding the hub 69' of the right hanger 49 is a right-hand end plate 74. See Fig. 4. End plate 74 has a ring portion 75, a hub 76, and a plurality of webs 77 for added strength. Hub 76 engages the periphery of the outer race 72 and the ring portion 75 engages the exterior side of the ball-bearing assembly. A packing ring 78 is positioned between the central aperture 79 of the end plate and the hub 69' of the right-hand hanger 49.

An internal flange 80 is provided in the bore of the hub 69' and engages the bearing 47 on one side, the other side of the bearing being spaced from the sun gear 44 by a spacer 81, the axial position of the sun gear being maintained by rings 82 positioned in grooves around the shaft at either side of the sun gear. On the other side of the flange 80 and between the hub 69' and the shaft 36 is a ring of packing material 83.

Adjacent the end of the hub 69' is a carriage plate 85 which is attached to the flange 86 of a thrust bearing 87 by fasteners 88 extending through the flange 86, the carriage plate 85 and into the hub of the right-hand hanger 69'.

Connected to the carriage plate 85 by fasteners 89 is a right-hand brake drum 90. A backing plate 92 is rigidly mounted on the right-hand bearing hanger 41 by suitable fasteners 93 and has mounted on it brake shoes 94 having a hydraulic wheel cylinder 95 and a retracting spring 96, a fluid line 97 leading from the cylinder 95 to a fitting 98 connected to a master cylinder assembly 100, the master cylinder assembly being mounted on the right bearing hanger 41.

Referring again to the interior of the housing 39, a left-hand end plate 102 (Fig. 3) is connected to the flange 65 of the housing by fasteners 103, and has a flange 104 engaging the external side of the outer race 72 of the roller bearing assembly mounted on the hub 69, the central portion of the end plate 102 having a bore 105 to receive the shaft 36, packing 106 being provided to seal the bore.

Rigidly mounted on the interior of the left-hand end 62 of the housing 39 is a clutch drum 108. Keyed on the portion of the shaft surrounded by the clutch drum 108 is a hub 110 having a flange 111 which is connected by fasteners 112 to a left-hand backing plate 114. It is apparent, therefore, that the backing plate 114 rotates with the shaft 36 and that the clutch drum 108 is affixed to the housing 39. A clutch shoe 116 mounted on the backing plate 114 may be actuated by a wheel cylinder 118 and suitable linkage including a retracting spring (not shown).

Each of the wheel cylinders 95 and 118 is of conventional design and includes a fitting 120 for connecting the fluid line thereto, and a bleeder valve 122. The cylinder 118 of the left clutch shoe is connected by line 124 to a fitting 125 on the shaft 36. The shaft 36 has a bore 127 extending to a countersunk recess 128 at the end of the shaft, the exterior of the end of the shaft being threaded at 129 to engage a master cylinder assembly 130. (See Fig. 9.)

The shaft 36 is carried in the left bearing hanger 40 by a bearing 131, the bearing hanger having an enlarged bore 132 at its other end for receiving the master cylinder assembly 130. At its base the bearing hanger 40 has flanges 133 engaged by fasteners 134 which secure it to a frame member 135 attached to the track 11.

The master cylinder 100 (Fig. 10) of the right brake drum assembly has a plug 136 engaged with the interior threads 129' of the master cylinder 100, the plug having a bore 137 and countersunk recess 137' connecting the interior of the master cylinder with the fluid line 97 by means of the fitting 98.

Each of the master cylinders 100 and 130 is of a substantially cylindrical configuration and has a central bore 140. At the rear of the central bore 140 is a flange 141 and a portion 142 of slightly less diameter than the bore 140. Positioned in the bore 140 is a piston 144 having a body of spool-like configuration with rims 145 at either end, a washer 146 being provided between the rims and adjacent the rear rim. In front of the piston is a resilient cup member 148 having a compression spring 149 engaged therewith resiliently spacing it and the piston away from a resilient washer or grommet 150. The master cylinder 130 has its grommet 150 seated in the counter-sunk recess 128 of the shaft 36, and the master cylinder 100 has its grommet 150 positioned in the countersunk recess 137' of the plug 136. Positioned over the bore of the grommet 150 is a resilient valve cup member 151 having a rigid cup member 152 of similar configuration engaged therewith, the member 152 being provided with a plurality of spaced apertures 153 on its sides.

Figure 2:
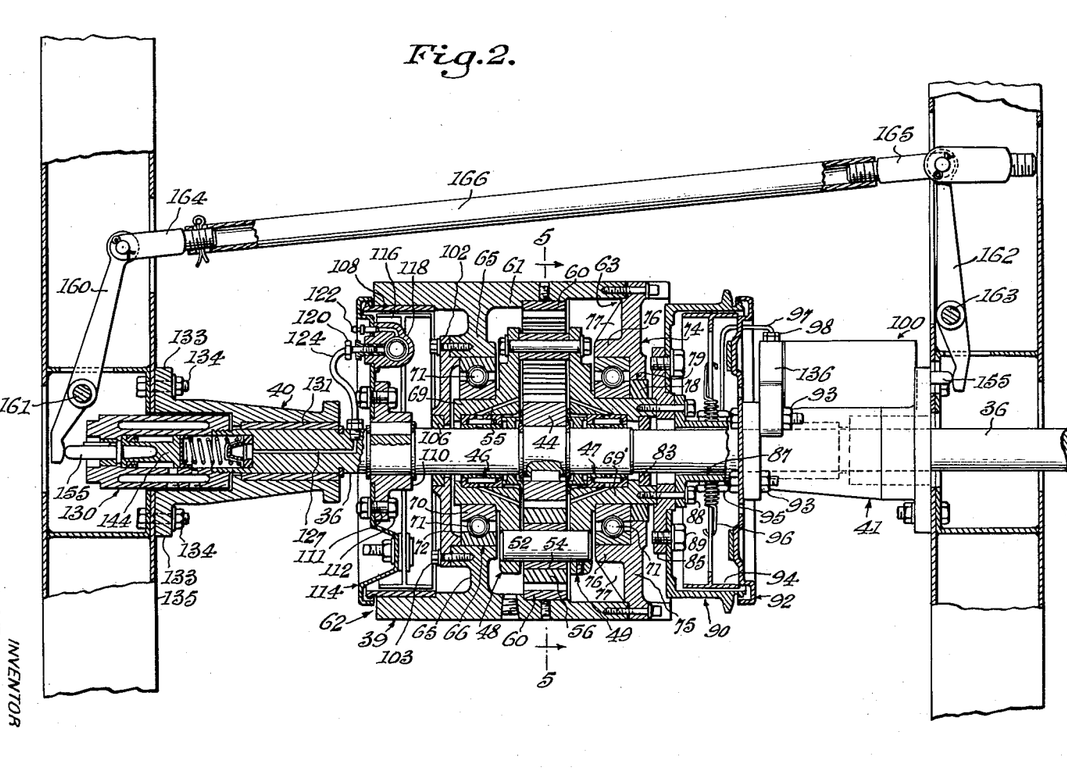
Fig. 2 is a partial section through the gear mechanism and housing therefor.
Figure 3:
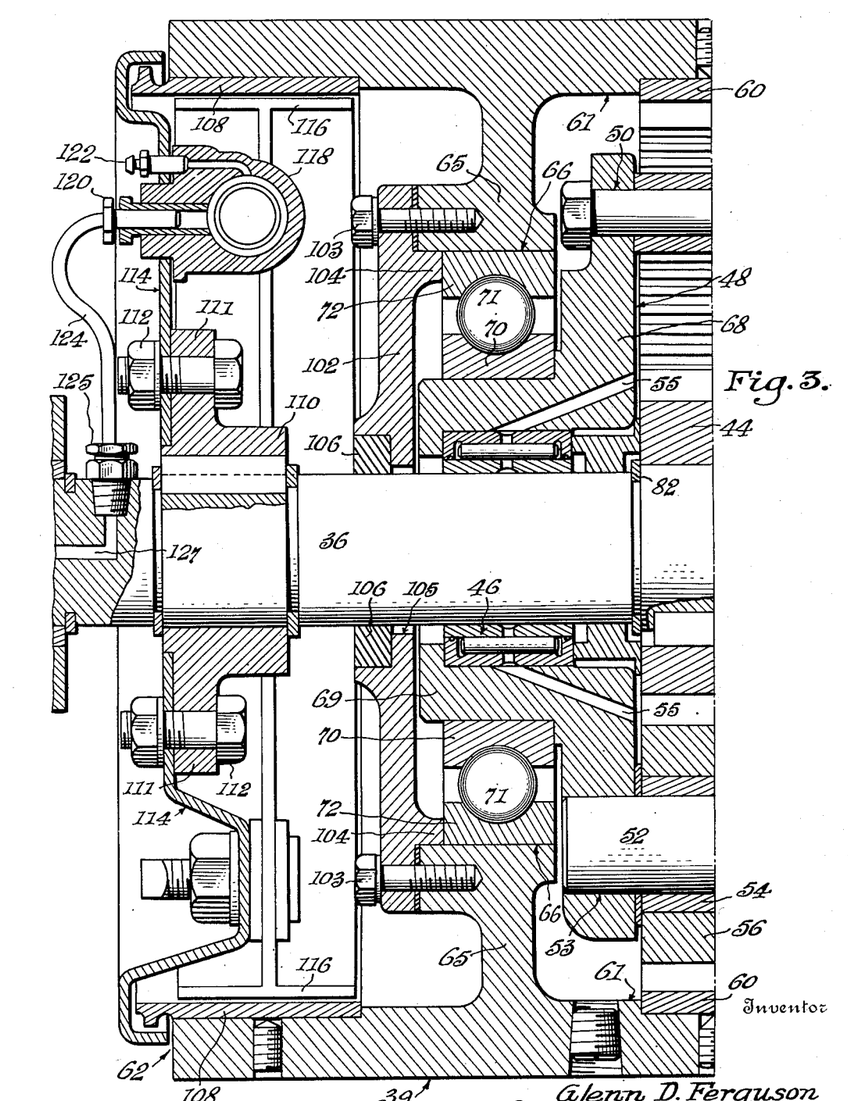
Fig. 3 is an enlargement in section of the left-hand portion of the gear and brake-clutch mechanism of Fig. 2.
Figure 4:
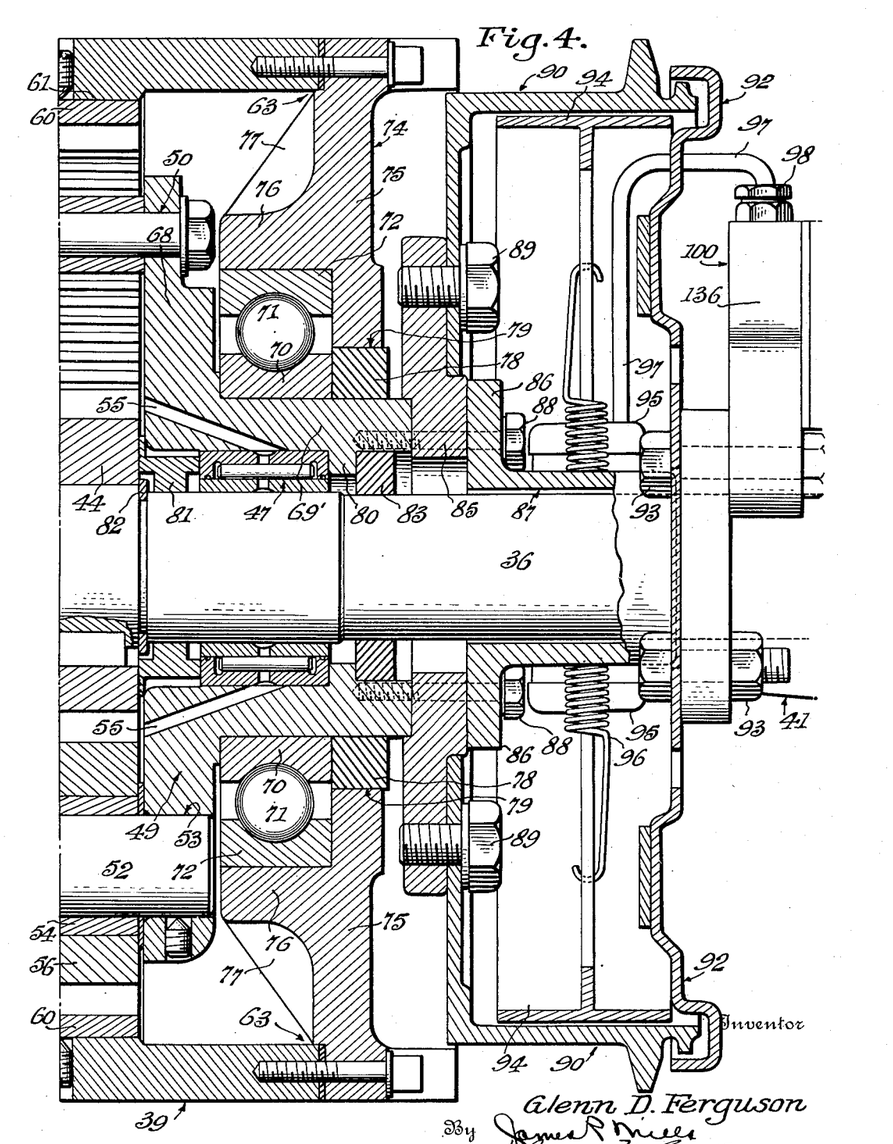
Fig. 4 is an enlargement in section of the right-hand portion of the gear and brake-clutch mechanism of Fig. 2.

At its other end the piston 144 has a recess 154 for receiving a push rod 155. The push rod 155 associated with the master cylinder 130 has a lever 160 mounted on a post 161 of the frame member 135 for actuation thereof. Similarly the push rod 155 of the master cylinder 100 has a lever 162 mounted on a pivot 163. At the other end of the levers 160 and 162, attached yokes 164 and 165 are connected by a tie rod 166 (Fig. 2). Also connected to the yoke 165 is a rod 168 (Fig. 1) which is adapted to be reciprocated through suitable linkage 169 actuated through a lever 170 pivotally attached to the end frame 17' by a bracket 171.

In the operation of the sawmill the saw 24 is rotated at substantially constant speed through the shaft 20, logs being fed to the saw by the reciprocable carriage 14, the carriage being returned to its previous position after the sawing operation for receiving another log and moving it into engagement with the saw at the desired rate of feed.

As the shaft 20 rotates, the shaft 32 to which the drive shaft 36 is coupled is driven in the opposite direction through the sprocket 26, chain 27 and the sprocket 34. Hence, under normal operating conditions, both the shafts 20 and 32 continuously rotate at constant speed.

With both the left-hand clutch and right-hand brake shoes 116 and 94 disengaged rotation of the sun gear merely causes the planetary gears to run around the internal gear 60, carrying with them the left and right hangers 48 and 49, the hangers being rotatably engaged with both the housing 39 and the shaft 36; hence, with the two shoes disengaged, rotation of the drive shaft does not rotate the housing 39.

In order to drive the housing 39 directly, the left clutch shoe 116 is engaged with the clutch drum 108, thus providing a direct connection from the shaft 36 through the collar 110, backing plate 114, the shoe 116 and drum 108 to the housing 39. Under these conditions the entire housing is driven directly from the shaft 36, and rotates in the same direction and at the same angular velocity as the shaft. Referring to Fig. 1, rotation of the shaft 32 in the direction of the arrow will result in winding the cable 42 onto the right half of the housing 39, thus retracting the carriage 14 from the saw, the cable 42 having an end attached to the carriage and passing around a sheave beyond the carriage. This portion of the operation is commonly referred to as the gigback.

Figures 5, 6, 7, 8, 13:
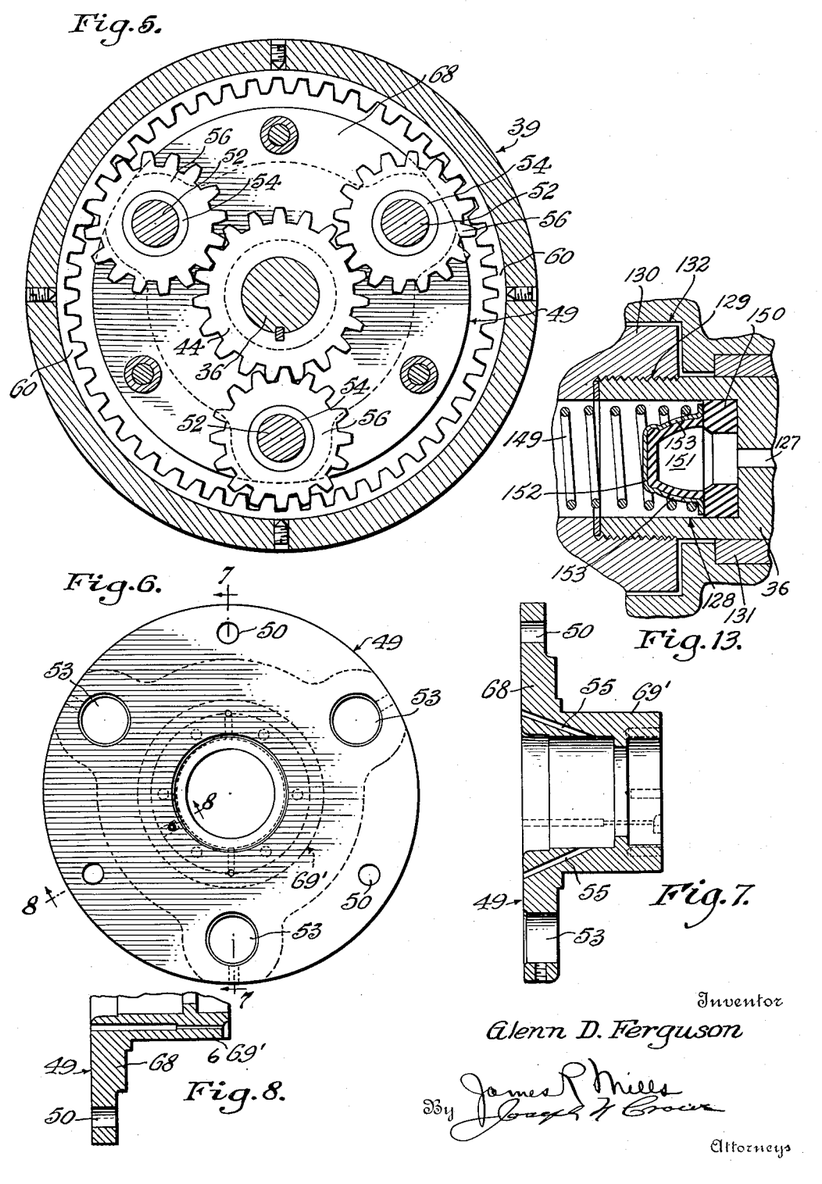
Fig. 5 is a section on the line 5—5 of Fig. 2.
Fig. 6 is a side elevation of a planetary gear hanger.
Fig. 7 is a section on the line 7—7 of Fig. 6.
Fig. 8 is a section on the line 8—8 of Fig. 6.
Fig. 13 is an enlarged fragmentary vertical section of a resilient valve cup member and associated parts shown in Figs. 9 and 10.
Figure 9:
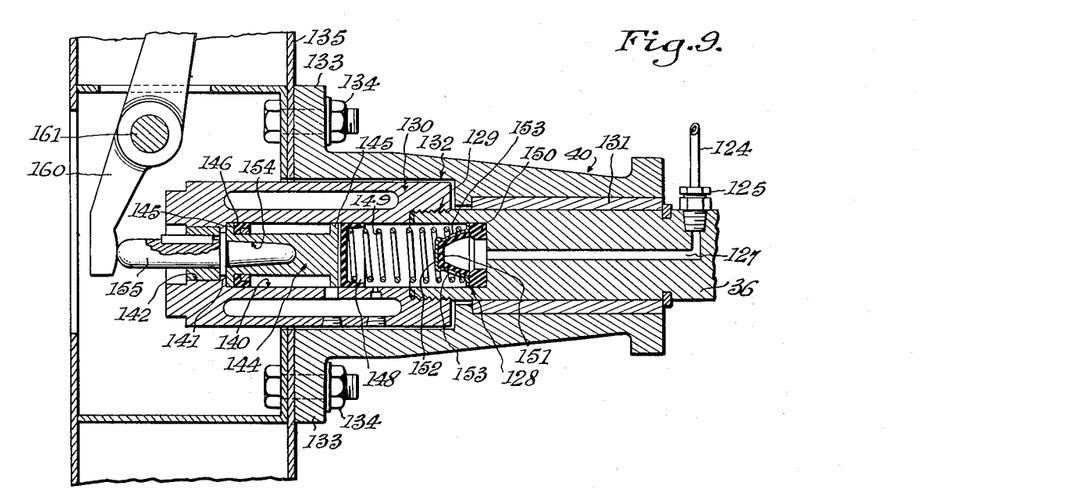
Fig. 9 is an enlargement in section illustrating the left-hand master cylinder assembly shown in Fig. 2.
Figure 10:
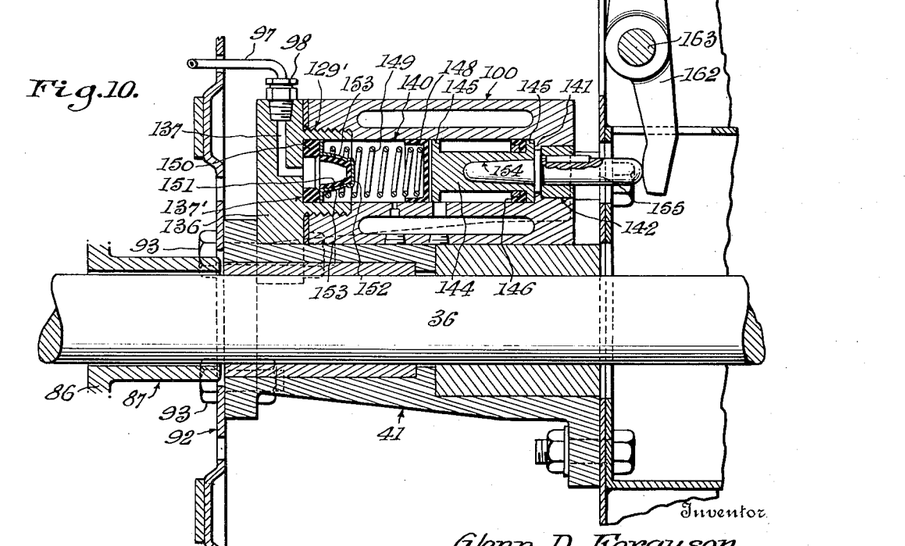
Fig. 10 is an enlargement in section illustrating the right-hand master cylinder assembly of Fig. 2.

To feed the carriage toward the saw and at a slower rate of speed the rotation of the drum must be reversed, and the angular velocity of the drum 39 reduced to less than that of the shaft 36. To achieve this condition clutch shoe 116 is released and brake shoe 94 mounted on the stationary backing plate 92 is engaged with brake drum 90. As the brake drum 90 is connected to the hangers 48 and 49, braking of the drum 90 similarly restricts rotation of the hangers and the planetary gear carried thereby. As previously pointed out, with both the left-hand clutch and right brake shoes disengaged, the planetary gears merely run around the internal gear 60 carrying the connected left and right-hand hangers with them. Accordingly, any restriction of rotation of the hangers results in torque being exerted on the internal gear 60. Thus, the right-hand brake shoe may be lightly engaged with its brake drum, in the manner of the gradual engagement of a clutch, to produce a light torque on the housing. Referring to Fig. 5, it is apparent that counter-clockwise movement of shaft 36 will produce clockwise movement of the planetary gears 56, and assuming that the connected hangers are restricted from movement by the engagement of the right-hand brake shoe with its drum, clockwise motion of the ring gear and the connected housing are produced. Hence, with the right brake assembly engaged, rotation of the housing is reversed.

Because of the larger movement of teeth in the internal gear 50 than in the sun gear 44, the angular velocity of the internal gear and housing are less than that of the sun gear. It is, of course, within the scope of the invention to vary the ratio between the gears to produce the difference in angular velocity desired. I have found that a ratio of 1 to 2.5, approximately, is particularly satisfactory for a device of the approximate proportions shown.

In order to actuate the brake and clutch the double-acting lever 170 may be oscillated to operate the left and right master cylinders. Actuation of the linkage 168, 169 to move a push rod 55 inwardly forces hydraulic fluid within the master cylinder through the apertures 153 of the cup 152 thus flexing the sides of the resilient cup 151 inwardly and permitting the fluid to flow into the bore 127 (or 137) through the fluid line to the respective brake or clutch cylinder. Retraction of the lever permits the spring 149 to move the piston 144 backward, fluid being drawn back through the fluid line and the bores to the master cylinder as the valve member 151 and cup 152 are lifted off the grommet seat 150 until the pressure is equalized.

Figure 12:
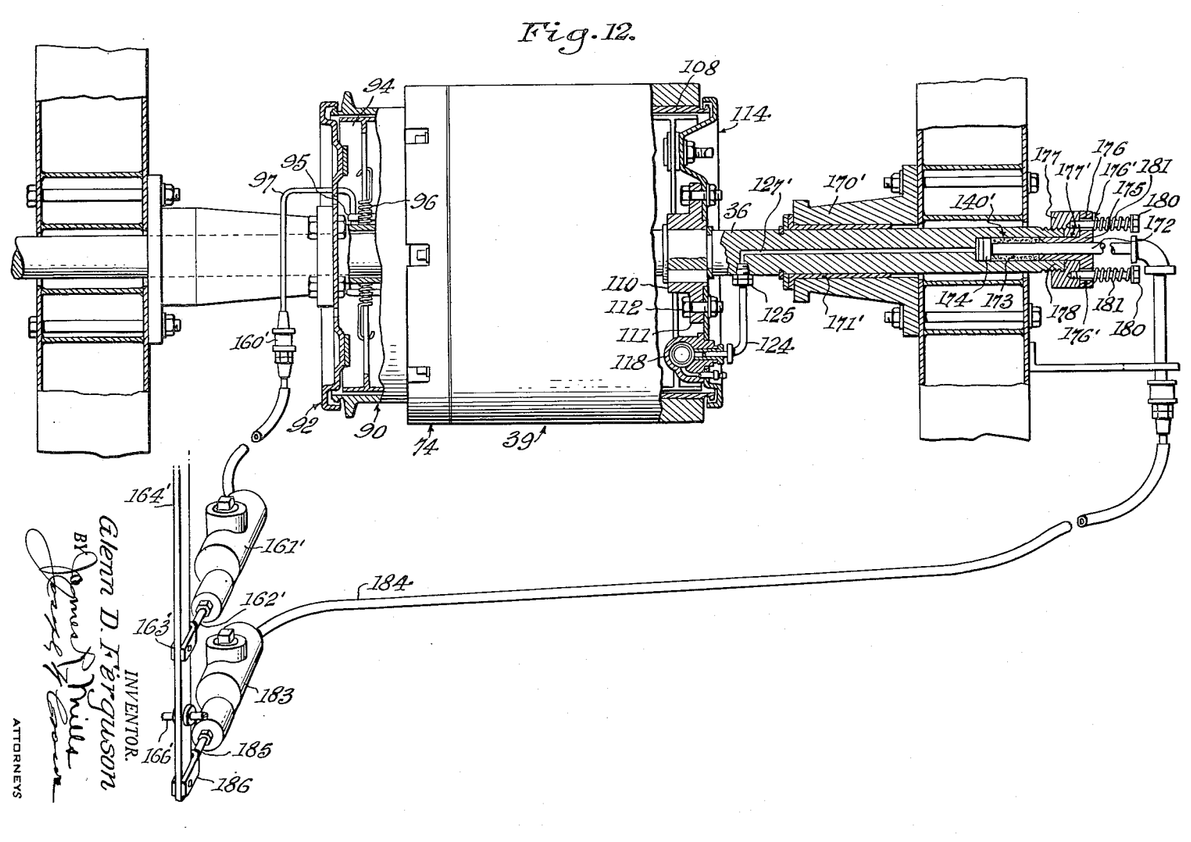
Fig. 12 is a plan view partly in section of the drive cylinder employed with the embodiment of Fig. 11.

The modification shown in Figs. 11 and 12 employs the same housing 39 and gear and brake-clutch mechanism previously described except for the master cylinder arrangement. Figs. 11 and 12, it is understood, are viewed from the opposite side of the structure from that shown in the preceding figures. In the modification, the brake drum 95 has the fluid line 97 extending through suitable coupling means 160' to a master cylinder 161' adapted to be actuated by the push rod 162' attached by yoke 163' to a lever 164', the lever being pivoted about the rod 166'. At the other end the shaft 36 is more elongated than that described in the preceding figures and is journalled in a bearing hanger 170' by a bearing 171'. The fluid line 124 from the cylinder 118 is attached to the shaft 36 by the fitting 125, the shaft 36 having a bore 127' communicating with the enlarged bore 140' at the end of the shaft.

Disposed within the enlarged portion 140' of the bore is a conduit 172 surrounded by a packing 173 and having an enlarged head 174 fitting snugly within the bore 140'. A nut 177 is threadedly engaged with the end 178 of the shaft 36 and has a bore 177' aligned with bore 140'. Extending into the bores is a plug 175 having a flanged portion 176, the flanged portion having a plurality of apertures 176' receiving bolts 180 threaded into the head of the nut 177. Compression springs 181 on the shafts of the bolts and abutting the bolt heads and nut 177 permit adjustment of the plug 175 against the packing 173.

The conduit 172 is connected to a master cylinder 183 through suitable connecting members and a fluid line 184 as shown. The master cylinder 183 has a push rod 185 connected by the yoke 186 on the side of the pivot 166 opposite to the push rod 162'.

In the operation of the modified form of the device, oscillation of the lever to a forward or reverse position to actuate the respective master cylinders actuates the brake or clutch mechanism to produce movement similarly to that described above in connection with Figs. 1 to 10.

Although the device has been described as including a hydraulic brake-clutch system the invention also contemplates the use of brake-clutch systems of other types, such as an electric brake-clutch mechanism.

Due to the particular construction and arrangement of the parts, the device is easy to operate, requiring merely the movement of a lever in one direction to effect a change in both speed and direction of rotation of the drum on which the cable is wound and hence the speed and direction of movement of the sawmill carriage. The gear and brake-clutch mechanism is largely self-contained and is sealed from the entry of foreign substance, thus simplifying installation, transportation and upkeep thereof. In addition, because of the elimination of a multiplicity of speed and direction changing means, such as pulleys, driving belts and the like, the bulk and weight of the mechanism is substantially reduced from that heretofore required. It is, furthermore, apparent that the unitary gear and brake-clutch mechanism is adapted for use with conventional sawmill equipment and that the installation and application thereto is relatively simple.

It is apparent, therefore, that the invention includes a planetary gear mechanism having a pair of brake and clutch assemblies associated therewith, the clutch one of the assemblies being adapted to connect the drive shaft in direct drive relation with the drum on which the cable is wound in order to provide a substantially rapid gigback; disengagement of the aforesaid clutch assembly and engagement of the brake prevents rotation of the assembly carrying the planetary gears such that rotation of the sun gear produces a rotation thereof without planetary movement and hence reverses rotation and angular velocity of the cable drum through an internal gear attached thereto. A further feature of the invention is the arrangement of the hydraulic connections to the brake and clutch mechanisms, one line passing through a portion of the rotating drive shaft and the other line being attached to a stationary brake shoe.

It will be apparent that the invention is not limited to the specific construction of the embodiment shown, but includes reasonable variation therefrom and the substitution of reasonable equivalents, and therefore the invention is only limited as found in the appended claims.

Having thus described my invention, what I claim as new and wish to secure by Letters Patent is:

1. Reciprocating mechanism for reciprocating a mechanically actuated carriage member for conveying articles to be worked to a working device for operating on the articles, and control means for said reciprocating mechanism, said mechanism and control means comprising a main shaft, a drive sprocket on the main shaft, an idler sprocket spaced from the drive sprocket, chain drive means engaging the drive sprocket and the idler sprocket and driving the drive sprocket, a drive shaft connected to said main shaft, a sun gear keyed on said drive shaft, left and right connected hangers rotatably mounted on said shaft, a plurality of planetary gears rotatably mounted between said hangers and carried thereby, said planetary gears being engaged with said sun gear, an internal ring gear engaged with said planetary gears, a housing for said gears and rigidly connected to said ring gear, said housing comprising a substantially cylindrical body open at the ends and having an internal bearing receiving flange, a cable wound around the housing and attached to the carriage, said hangers each having hub portions projecting from a side thereof, a bearing mounted on each of the hub portions, the bearing on the hub portion of the left hanger mounting the bearing receiving flange, a first plate secured to the right end of the housing and engaging the bearing on the right hanger, a second plate secured to the bearing receiving flange and engaging the bearing on the left hanger, a carriage plate connected to the right hanger, a right brake drum connected to said carriage plate, a right brake shoe adapted to engage said brake drum, a right backing plate for said brake drum and carrying said brake shoe, said backing plate being secured to the frame, a left clutch drum rigidly mounted on the left end of said housing, a hub rigidly mounted on said shaft adjacent the left clutch drum, a left backing plate rigidly mounted on said hub, a left clutch shoe mounted on said backing plate and adapted to engage said clutch drum, and actuating means for each of said shoes, said actuating means for said shoes each comprising a hydraulic cylinder connected to said shoe, a master cylinder, and fluid passage means connecting said cylinder and said master cylinder, the left master cylinder being rigidly connected to an end of said drive shaft; a bearing hanger mounted on the frame, the end of said drive shaft being journalled in said bearing hanger, the fluid passage means for said left master cylinder including a bore through a portion of said drive shaft and connected to tubing extending to the left clutch cylinder, and a bearing hanger for the portion of the drive shaft at the right side of the housing and rigidly attached to the frame, the right master cylinder being rigidly mounted on said bearing hanger; each of said master cylinders comprising a cylindrical body having a reservoir and a bore in communication therewith, a piston in the bore, a push rod for actuating the piston, a gasket cup engaged with said piston, a grommet having a resilient cup-shape valve engaged therewith and a metal cup engaged with the valve, the cup having spaced apertures on its side, a spring normally holding said valve apart from said piston; and actuating means for said push rods, said means including a lever pivotally mounted adjacent each push rod and adapted to engage the push rod, means connecting the levers, and means for actuating the levers simultaneously, one being depressed as the other is retracted.

2. Reciprocating mechanism for a mechanically actuated carriage member conveying workpieces to a working device for operating on the workpieces and control means for the said reciprocating mechanism, said mechanism and control means comprising a drive shaft, a mandrel shaft adjacent to the drive shaft, means on said drive shaft engaged with and adapted to be driven by the mandrel shaft, a sun gear keyed on said drive shaft, means rotatably mounted on said shaft and carrying a plurality of rotatably mounted planetary gears, said planetary gears being engaged with said sun gear, an internal ring gear engaged with said planetary gears, a housing for said gears and rigidly connected to said ring gear, means engaged with the housing operative to move the carriage, means rotatably mounting the housing on the means carrying the planetary gears, a right brake drum connected to the means carrying the planetary gears, a right brake shoe adapted to engage said brake drum, a right backing plate for said brake drum and carrying said brake shoe, said backing plate being secured to the frame, a left clutch drum rigidly mounted on the left end of said housing, a hub rigidly mounted on said shaft adjacent the left clutch drum, a left backing plate rigidly mounted on said hub, a left clutch shoe mounted on said backing plate and adapted to engage said clutch drum, and actuating means for each of said shoes, said actuating means for said shoes each comprising a hydraulic cylinder connected to said shoe, a master cylinder, and a fluid passage connecting said cylinder and said master cylinder, the left master cylinder being rigidly connected to an end of said drive shaft; a bearing hanger mounted on the frame, the end of said drive shaft being journalled in said bearing hanger, the fluid passage for said left master cylinder including a bore through a portion of said drive shaft and connected to tubing extending to the left clutch cylinder, and a bearing hanger for the portion of the drive shaft at the right side of the housing and rigidly attached to the frame, the right master cylinder being rigidly mounted on said bearing hanger; each of said master cylinders comprising a cylindrical body having a reservoir and a bore, a piston in the bore, a push rod for actuating the piston, a gasket cup engaged with said piston, a grommet having a resilient cup-shape valve engaged therewith and a metal cup engaged with the valve, the cup having spaced apertures on its side, a spring normally holding said valve apart from said piston; and actuating means for said push rods, said means including a lever pivotally mounted adjacent each push rod and adapted to engage the push rod, means connecting the levers, and means for actuating the levers simultaneously, one being depressed as the other is retracted.

3. In a saw mill including a frame supported mandrel shaft mounting a saw and a carriage movably mounted adjacent thereto, the improvements which include mechanism for reciprocating the carriage and control means for the said mechanism, said mechanism and control means comprising a drive shaft, means on said drive shaft engaged with and adapted to be driven by the mandrel shaft, a sun gear keyed on said drive shaft, means rotatably mounted on said shaft and carrying a plurality of rotatably mounted planetary gears, said planetary gears being engaged with said sun gear, an internal ring gear with said planetary gears, a housing for said gears and rigidly connected to said ring gear, said housing being adapted to engage means operative to move the carriage, the housing being rotatably mounted on the means carrying the planetary gears, a brake means connected to the means carrying the planetary gears, a first actuating means for said brake means and secured to the frame, a clutch means mounted on said housing, actuating means for said clutch means and mounted for rotation with said shaft, and means for operating each of said actuating means, said operating means comprising first and second master cylinders, and fluid passage means connecting said actuating means and said master cylinders, the first master cylinder being rigidly connected to an end of said drive shaft adjacent an end of said housing; a bearing hanger mounted on the frame, an end of said drive shaft being journalled in said bearing hanger, the fluid passage for said first master cylinder including a bore through a portion of said drive shaft and connected to tubing extending to the first actuating means, and a bearing hanger for the portion of the drive shaft at the other end of the housing and rigidly attached to the frame, the second master cylinder being rigidly mounted on said bearing hanger; each of said master cylinders comprising a cylindrical body having a reservoir and a bore, a piston in the bore, a push rod for actuating the piston, a gasket cup engaged with said piston, a grommet having a resilient cup-shaped valve engaged therewith and a metal cup engaged with the valve, the cup having spaced apertures on its side, a spring normally holding said valve apart from said piston; and actuating means for said push rods, said means including a lever pivotally mounted adjacent each push rod and adapted to engage the push rod, means connecting the levers, and means for actuating the levers simultaneously, one being depressed as the other is retracted.

References Cited in the file of this patent

UNITED STATES PATENTS

| Number | Name | Date |
|---|---|---|
| 200,448 | Frost | Feb. 19, 1878 |
| 294,442 | Clark | Mar. 4, 1884 |
| 475,046 | Palmer | May 17, 1892 |
| 638,184 | Norris | Nov. 28, 1899 |
| 1,098,403 | Reck | June 2, 1914 |
| 1,619,449 | Waters | Mar. 1, 1927 |
| 1,653,262 | Dickson | Dec. 20, 1927 |
| 2,238,006 | Attridge | Apr. 8, 1941 |
| 2,371,828 | Kuhns et al. | Mar. 20, 1945 |
| 2,543,278 | Davis | Feb. 27, 1951 |
| 2,560,126 | Pease | July 10, 1951 |
| 2,631,620 | Petersen | Mar. 17, 1953 |